Feb. 21, 1967   R. D. GOODFELLOW, JR., ET AL   3,305,274
MINING MACHINE TOOL AND HOLDER
Filed Dec. 14, 1964   2 Sheets-Sheet 1
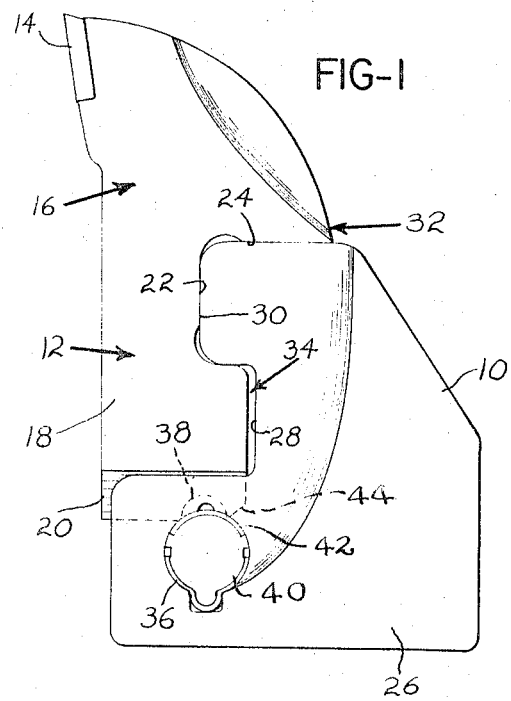
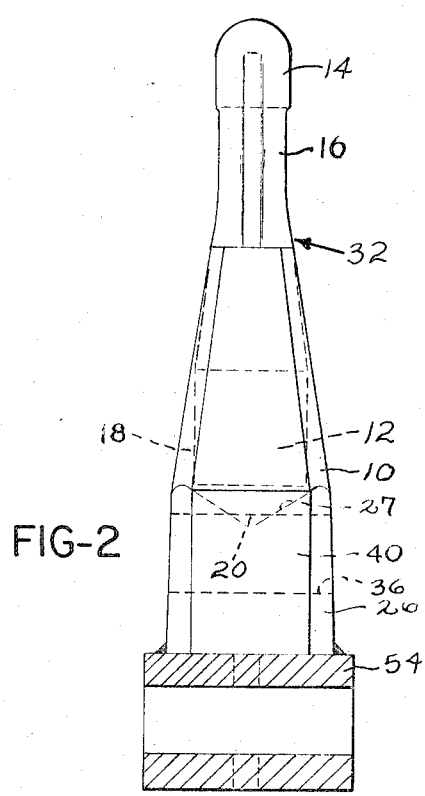
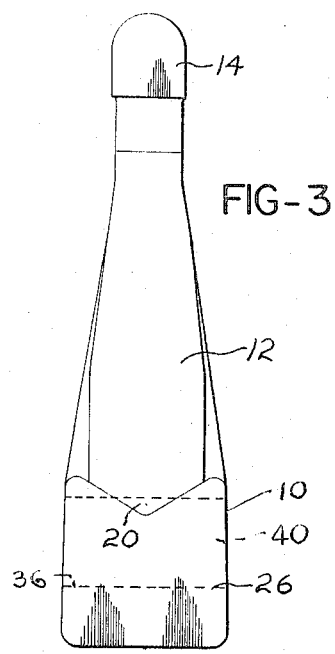
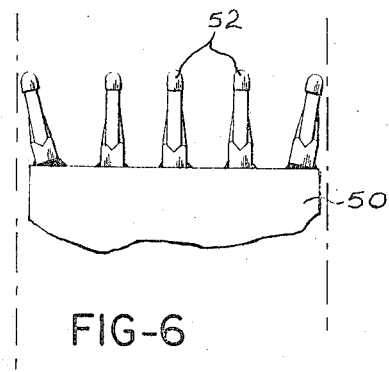
INVENTORS
ROBERT D. GOODFELLOW, JR.
F. J. KNIFF
BY
Toulmin & Toulmin
ATTORNEYS Feb. 21, 1967 R. D. GOODFELLOW, JR., ET AL 3,305,274
MINING MACHINE TOOL AND HOLDER
Filed Dec. 14, 1964 2 Sheets-Sheet 2
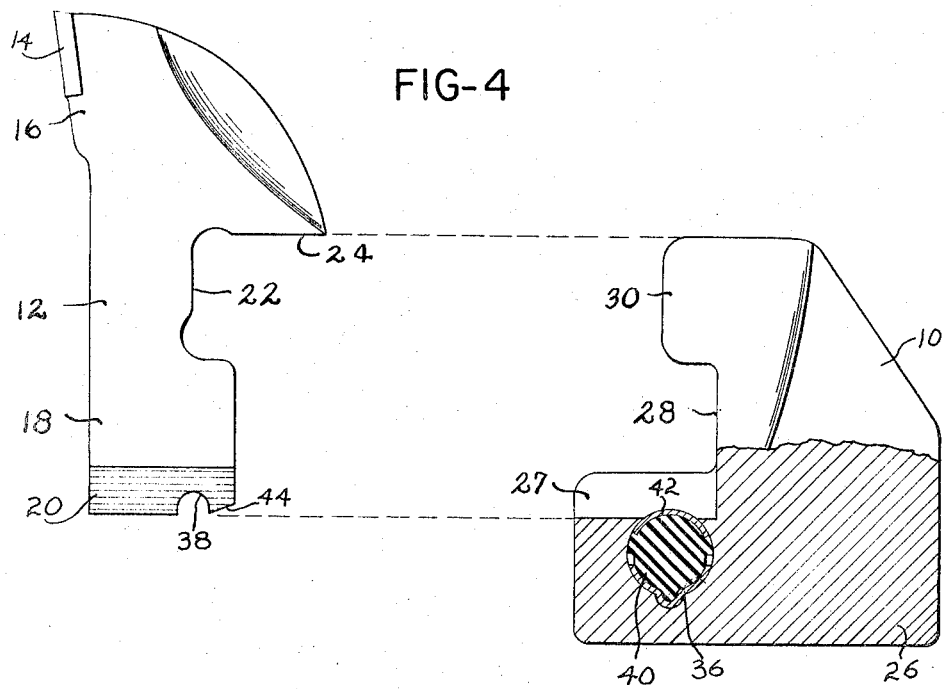
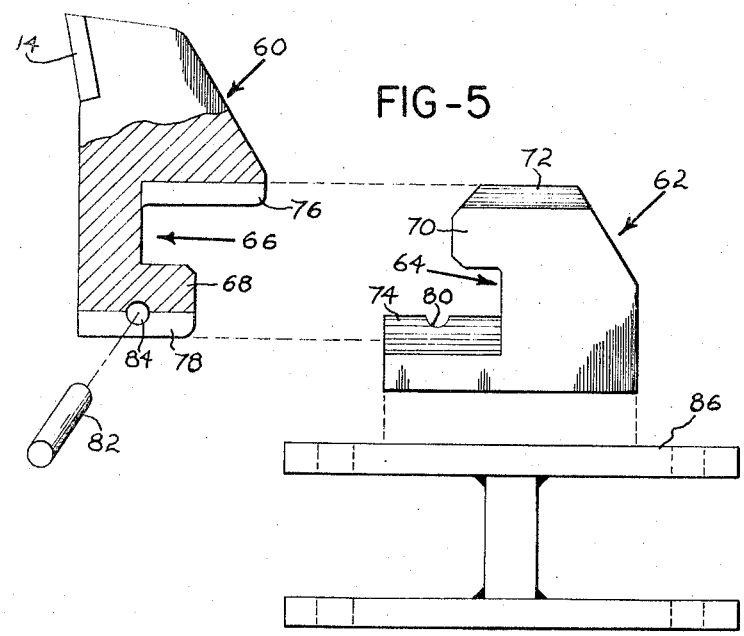
INVENTORS
ROBERT D. GOODFELLOW, JR.
T. J. KNIFF
BY
Toulmin & Toulmin
ATTORNEYS //<br>
United States Patent Office 3,305,274
Patented Feb. 21, 1967

3,305,274
MINING MACHINE TOOL AND HOLDER
Robert D. Goodfellow, Jr., and Thomas J. Kniff, Bedford, Pa., assignors to Kennametal Inc., Latrobe, Pa., a corporation of Pennsylvania
Filed Dec. 14, 1964, Ser. No. 418,035
9 Claims. (Cl. 299—92)

This invention relates to mining tools and is particularly concerned with a cutter bit and holder block arrangement for mining tools. Tools of this nature are widely employed in connection with mining machines which have tools mounted on drums or on chains or on rotating plates or auger-like elements, and which are employed for taking out or ripping out mineral deposits such as coal and the like.

Mining machines of the nature referred to above are, of course, well known. Such machines are subjected to extremely heavy duty, partly because of the nature of the work itself and partly because the machines are usually operated at or near the ultimate capacity thereof by the machine operators to maintain a high rate of production. The material being cut by the cutters or cutter bits is generally relatively hard and quite often includes stones and the like which are often harder. Because of the type of material being cut by the cutters conventional hard steel cutters deteriorate quite rapidly, and it is sometimes the case that cutters of hard steel will last only a few hours before it is necessary to replace or sharpen the cutters. The severe usage to which the cutters are subjected has led to the development of cutters having cemented tungsten carbide cutting inserts or elements thereon which take the cutting wear. An element, or tip, of this nature is brazed or otherwise affixed to a steel body, usually a forging, which takes the thrust imposed on the cutting element by the cutting load. Carbide tipped cutter bits represent a distinct improvement because they have long life and need not be replaced nearly as frequently as the hard steel cutter bits formerly employed and with which most mining machines are initially supplied.

The conventional arrangement for a mining tool of the nature referred to, which may be referred to as "a cutter bit" is a body which has a head or outer end portion and a shank, with the body mounted in a holder block having a hole therein for receiving the shank. A set screw is usually employed to lock the shank in the holder.

It is also known, in connection with certain types of cutter bits, to hold the cutter bit in a holder by utilizing a rubber-like key so that the cutter bit can be driven into the holder to mount it and to enable it to be pried from the holder when it is to be removed.

In every case of known cutter bit mountings problems are encountered in removing or replacing the cutter bits after a mining machine has been in use.

In the first place, the conditions under which the cutter bits are employed are such that dust and grit accummulate which can wedge the shank of the cutter bit in its holder block. Furthermore, when coal is being mined, there is often moisture present and this will bring about an acid condition which can corrode the holder and the cutter bit shank and the threads of set screws, and replacement of the cutter bits under these circumstances can be very troublesome and time-consuming.

Still further, the conventional cutter bit having a head portion and a shank of reduced diameter extending into a hole in a holder block does not present the material of the cutter bit to its greatest advantage with respect to structural strength. The result is that, under extremely heavy cutting loads or upon striking stone or the like, the cutter bits sometimes bend in the region of the face of the holder block, therefore making a defective cutter bit and sometimes making it even more difficult to remove the cutter bit from the holder block.

With the foregoing in mind, the present invention has as a particular object the provision of a mining tool cutter bit and a holder block therefor in which the disadvantages and drawbacks of known cutter bits and holder blocks are avoided.

A particular object of the present invention is the provision of a mining tool cutter block and a holder therefor in which the cutter bit can easily be removed from the holder block and easily be inserted thereon and in a minimum of time.

Still another object of this invention is the provision of a mining tool cutter bit and a holder therefor in which the material of the holder and cutter bit is advantageously disposed in respect to realizing the maximum structural strength of the elements.

Still another object of this invention is the provision of a novel mining tool cutter bit and a holding block therefor in which conditions of dust and acid and the like do not make it difficult to remove and replace the cutter bit.

A particular object of the present invention is the provision of a cutter bit and holder block therefor in which a shank on the cutter bit and a socket in the holder block are eliminated, and the difficulties attendant thereto are also eliminated.

It is also an object of this invention to provide a novel mining machine cutter bit and holder block therefor in which threaded elements to connect the cutter and holder block are eliminated.

These and other objects and advantages of this invention will become more apparent upon reference to the following specification taken in connection with the accompanying drawings, in which:

FIGURE 1 is a side elevational view showing an improved mining tool cutter bit and holder block therefor in assembled relation;

FIGURE 2 is a rear view of the assembly of FIGURE 1 looking at the assembly from the right side of FIGURE 1 and showing the holder block cemented to a chain length;

FIGURE 3 is a front view of the assembly of FIGURE 1 looking in toward the left side of FIGURE 1;

FIGURE 4 is a view like FIGURE 1 with the holder block part in section to show the key for holding the cutter bit in the holder block and showing the cutter bit and holder block in dissassembled relation;

FIGURE 5 is a side view partly broken away and in disassembled relation of a modified form which the cutter and holder block can take and also showing a typical chain link to which the holder block is to be welded, and FIGURE 6 is a fragmentary view showing a typical mounting of a plurality of the cutter bit and holder block assemblies on a drum or the like.

Referring to the drawings somewhat more in detail, in FIGURES 1, 2 and 3 the holder block is indicated at 10 and the cutter bit mounted thereon is indicated at 12. The cutter bit comprises a cemented tungsten carbide tip or cutter element 14 mounted on the forward side of the head or outer end portion 16 of the body of the cutter bit. The cutter bit body, which is generally bar-like, extends downwardly from the head portion to what might be referred to as a foot or inner end portion of the cutter bit body, the rearward side of which is formed with a leg member at 18, the extreme lower end of which has a bevel 20. The back of the cuter bit body is notched at 22. The head or outer end portion 16 extends backwardly from the carbide element 14 at a predetermined clearance angle and curves downwardly and terminates in a surface 24 which forms one side of the aforementioned notch 22.

The holder block 10 generally comprises a base region 26 which has a V-shaped notch 27 for receiving the beveled portion 20 formed on the inner end of the cutter bit body. Block 10 is also formed with a notch 28 for receiving the rearwardly projecting part of the cutter bit body immediately below the notch 22 thereof.

The formation of the notch 28 in that portion of the holder block extending upwardly from the base portion 26 thereof forms a sort of head region terminating at the upper end in a forwardly projecting part or leg portion 30 extending into notch 22 and abutting the vertical bottom surface thereof and also presenting a surface at the top on which the aforementioned surface 24 at the back end of the head of the cutter bit body rests. As will be seen in FIGURES 1 through 3, the cutter bit is firmly supported by the holder block but that the support is such that no extremely finely machined surfaces are required. The cutter bit can readily be removed from the block either by striking the cutter bit in the region indicated by the arrow 32, or by prying the cutter bit off with a fairly sharp-edged pinch bar inserted or driven into the gap indicated by arrow 34. In any case, the assembly is substantially insensitive to the accumulation of grit and dust and is not materially affected by acid conditions which are encountered in some work locations. The body of the cutter bit and the holder block can advantageously be forged, and at the most, minor machining is required on certain flat surfaces to obtain good contact between the cutter bit and holder. The manufacture of the two parts is relatively simple and inexpensive.

The cutter bit may be held in place on the holder block by a pin driven through hole 36 provided in the base portion 26 of the holder block and intersecting the apex of the bevel ridge portion 20 of the cutter bit, and which ridge is provided with a notch 38 for receiving the pin.

Preferably, and as seen in FIGURE 4, the hole 36 in the holder block receives a rubber-like pin or block 40 having an arcuate metal layer 42 toward the cutter bit. The cutter bit, in turn, has the rear edge tapered as at 44, and by this arrangement the cutter bit can be put in place on the holder block and be driven into working position, as by a hammer.

As will be seen in FIGURES 2 and 3, a particular feature of the present invention is that the assembly tapers generally outwardly from the top to the botatom so that cuts as deep as may be desired can be taken within the limits of the length of the assembly.

Heretofore, when the cutter bits were provided with shanks extending into holder blocks with holes for receiving the shanks, a shoulder of substantial dimensions would be formed at the face of the holder block and this would limit the permissible length of penetration of the cutter bit during a cutting operation. By shaping the assembly as shown in FIGURES 2 and 3, deeper cuts can be made and less wear takes place on the sides of the cutter bit and the holder block. It will be appreciated that what is referred to as "cutting" is generally more of a "crushing" action so that the clearance that will be established on each side of the cutter bit as the material being mined is cut will probably exceed the lateral dimensions of the holder block.

Due to the tapering configuration referred to, the assembly according to the present invention is adapted for being tilted slightly on its supporting member to provide clearance at the ends of the member. For example, in FIGURE 6 a drum 50 illustrated and a plurality of assemblies 52 such as have been described are mounted thereon, and it will be noted that the two terminal ones of the row of assemblies shown are tilted outwardly. Clearance is thus provided at the opposite ends of the drum.

The holder blocks are also adapted for being welded to chain links, one of which is indicated at 54 in FIGURE 2, and the assembly could also be tilted on the chain links if so desired, as, for example, the chain links on the terminal ones of a row of chains.

FIGURE 5 shows a somewhat modified structure having a cutter bit generally indicated at 60 and a holder block generally indicated at 62. As in connection with the first described modification, holder block 62 is generally C-shaped in configuration including a notch 64 opening toward the cutter bit while the body or shank portion of the cutter bit is also C-shaped but opening toward the holder block and includes a notch 66. Notch 64 receives lower or inner projecting leg portion 68 of the cutter bit 60 while notch 66 receives the upper forwardly projecting leg portion 70 of the holder block. In the modification of FIGURE 5, the holder block has two V-shaped ridges at 72 and 74 adapted for being received in the V-shaped notches 76 and 78 of the cutter bit. A notch 80 in the peak of V-shaped portion 74 of the holder block is adapted for receiving lock pin 82 driven through bore 84 of the cutter bit when the cutter bit is assembled with the holder block in order to retain the two parts in assembled relation. Pin 82 may be similar to pin 40 in construction.

Holder block 62 is adapated for being welded or brazed to a drum or the like or, for example, to a chain link 86 shown in FIGURE 5, as with the first described modification. The modification of FIGURE 5 has the advantage that the cutter bit and its holder block can easily and quickly be assembled and disassembled, because the parts do not tend to be locked together by dust and grit or by corrosion. Similarly, to the first described modification, the material of the cutter bit and holder block are favorably disposed with respect to realizing the maximum strength therefrom.

The cutter bit and holder block according to the present invention can be incorporated in new manufacture, but the assembly also readily serves as a replacement item for existing machines by removing the conventional holder blocks of the existing machines and replacing them with holder blocks according to the present invention.

It will be understood that this invention is susceptible to modification in order to adapt it to different usages and conditions; accordingly, it is desired to comprehend such modifications within this invention as may fall within the scope of the appended claims.

What is claimed is:

1. In combination, for use as a mining tool; a cutter bit comprising a bar-like body having an outer end and an inner end and a forward side and a rearward side, a hard cutting element on the forward side of the outer end of said body, a substantially rectangular notch of substantial dimensions in the intermediate portion of the rearward side of said body, a holder block for supporting said cutter bit having one portion engaging the inner end of said body and extending along the rearward side of said body to said notch and having a substantially rectangular leg portion fitting relatively closely into said notch, and retaining means carried by one of said body and block and engaging the other thereof and releasably retaining said cutter bit in position on said block.

2. The combination according to claim 1 in which said retaining means is carried by said block.

3. The combination according to claim 1 in which said body on the rearward side of the outer end extends rearwardly over the tip of the leg portion of said block a substantial distance to provide support for the outer end of said body.

4. The combination according to claim 1 in which said inner end of said body and the said notch therein and said one portion of said block and the said leg portion thereof extend in a direction substantially perpendicular to the length of said body.

5. The combination according to claim 4 in which the said leg portion of said block is longer than the depth of said notch to provide a space between the rearward side of said body and the region of said block between said leg portion and said one portion thereof for the insertion of a prying device to separate the cutter bit from the block.

6. The combination according to claim 4 in which said one portion of said block and the side of said leg portion thereof remote from said one portion are in the form of V-shaped ridges in cross section and the inner end of said body and the outer side of the notch in said body are in the form of grooves in cross section which are complementary to and receive said ridges, a lateral hole in said body near the said inner end thereof intersecting the said groove in the inner end of the body at the bottom of the groove, and a lateral notch in the ridge on said one portion of said block positioned to receive a pin in said hole when said cutter bit is assembled on said block.

7. The combination according to claim 4 in which the inner end of said body and said one portion of said block are in the form of interfitting elements of a V-shaped ridge and complementary groove extending in the forward to backward direction of said body, a transverse hole in the one of said body and block having the groove therein intersecting said ridge and groove in the region of the peals of said ridge, and said retaining means comprising a rubber-like pin in said hole having an arcuate metal layer on at least that portion of the periphery thereof that is engaged by said ridge when the cutter bit is mounted on said block.

8. The combination according to claim 7 in which the opposite side faces of said body and block are generally planar and also generally co-planar whereby the assembly of said cutter bit and block is free of lateral shoulders.

9. The combination according to claim 8 in which said body tapers outwardly from its outer end to its inner end and said block tapers outwardly from the leg portion thereof toward said one portion thereof.

References Cited by the Examiner

UNITED STATES PATENTS

| 1,595,112 | 8/1926 | Mentzer | 299—91 X |
| 1,951,988 | 3/1934 | Mekeel | 37—142 |
| 2,658,740 | 11/1953 | Dann | 299—93 |
| 3,063,691 | 11/1962 | Osgood | 299—92 |

FOREIGN PATENTS 218,065  7/1924  Great Britain.

ERNEST R. PURSER, *Primary Examiner.*

CHARLES E. O'CONNELL, *Examiner.*